Jan. 8, 1957 H. E. WILLOCK 2,776,846
AUXILIARY REAR AXLE MOUNTING FOR TRUCKS
Filed Feb. 23, 1954 2 Sheets-Sheet 1
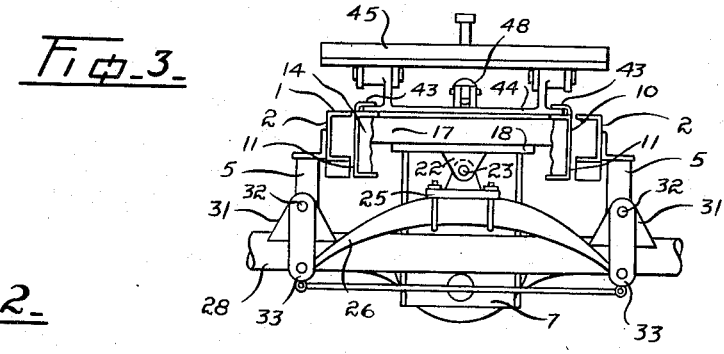
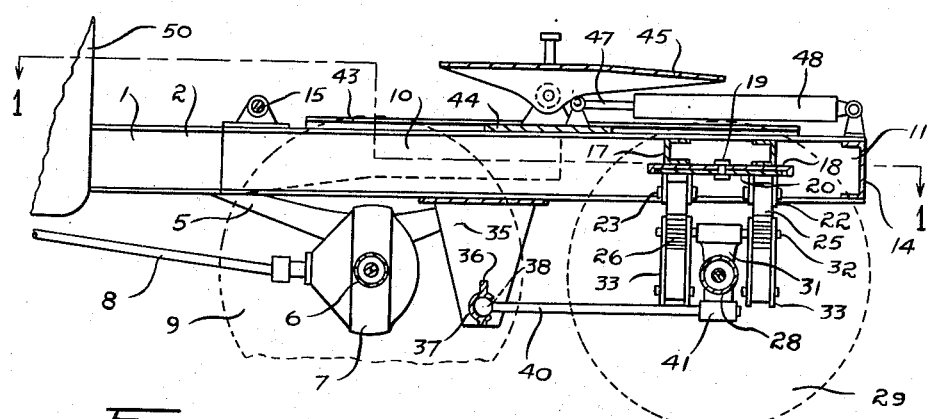
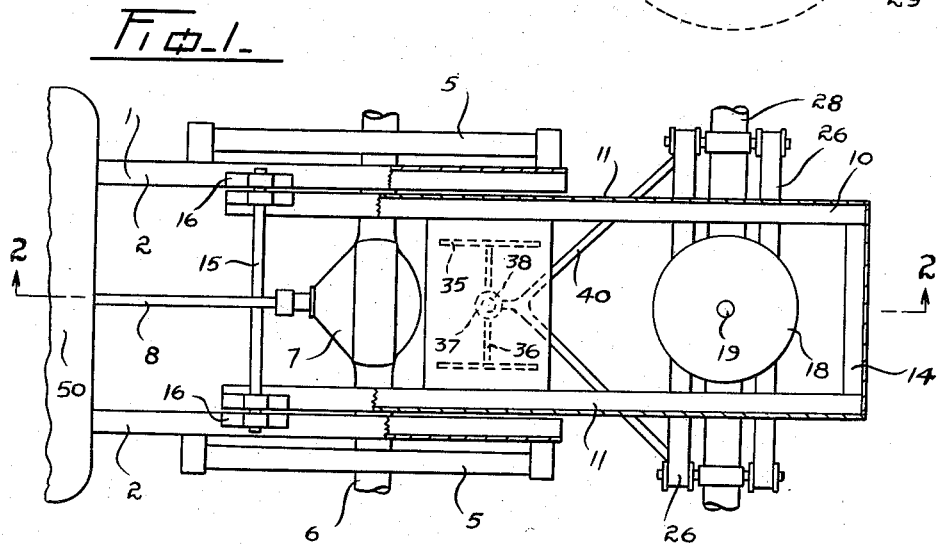
INVENTOR
HARRY E. WILLOCK
ATTORNEY Jan. 8, 1957   H. E. WILLOCK   2,776,846
AUXILIARY REAR AXLE MOUNTING FOR TRUCKS
Filed Feb. 23, 1954   2 Sheets-Sheet 2
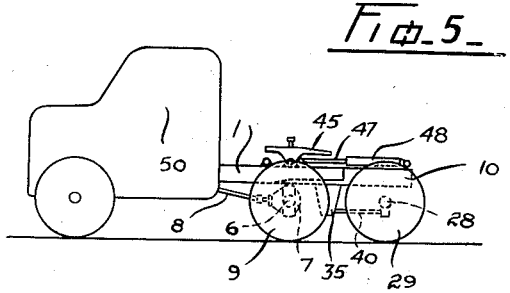
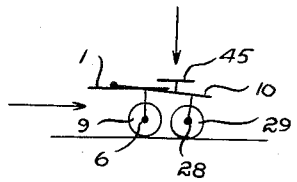
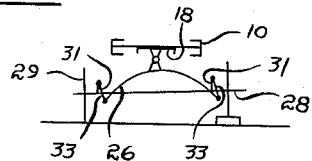
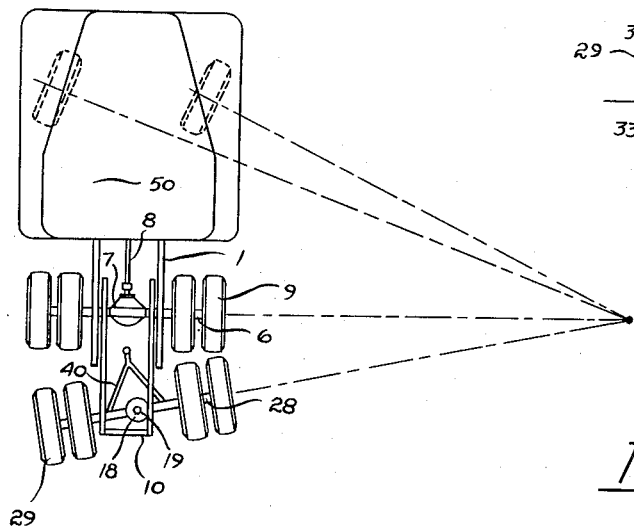
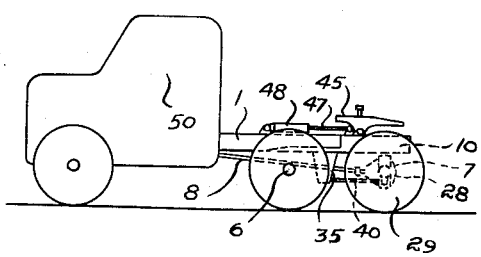
INVENTOR
HARRY E. WILLOCK
ATTORNEY «United States Patent Office»

2,776,846
Patented Jan. 8, 1957

2,776,846

AUXILIARY REAR AXLE MOUNTING FOR TRUCKS

Harry E. Willock, Vancouver, British Columbia, Canada

Application February 23, 1954, Serial No. 411,971

2 Claims. (Cl. 280—407)

My invention relates to improvements in rear axle mounting, which is particularly adapted for use in heavy trucks of the six wheel type and in semi-trailer trucks.

In trucks having two rear axles closely connected together it is not uncommon when encountering soft road conditions for the load carried by both axles to be insufficient to afford adequate traction, so that one or both of the driven wheels cannot obtain sufficient traction.

By the use of the conventional rigid mounting of the axles so that they remain parallel to each other when making a turn, heavy scuffing and wear of the tires takes place, and also by virtue of the axles being held parallel a serious loss of power occurs in driving the vehicle around a curve and heavy strain has to be applied to the steering wheel to change the vehicle direction from straight to turn and vice versa.

The present invention is designed to overcome all these defects and difficulties and to provide means for articulating the close coupled axles, so that the trailing axle of the two will swing transversely about a pivot adjacent the centre of the leading axle, so that a line extending axially from each axle to one side of the vehicle will intersect at the point about which the vehicle turns. The mounting of the axles also provides for the tracking of the wheels of both axles when moving rearwardly as well as forwardly.

Other objects of the invention will apear as the specification proceeds.

Referring to the accompanying drawings:

Figure 1 is a plan view of the invention taken on the line 1—1 of Figure 2.

Figure 2 is a longitudinal sectional view taken on the line 2—2 of Figure 1.

Figure 3 is a rear end view showing the spring suspension of the rear axle.

Figure 4 is a side elevational view of the invention fitted to drive the rear axle.

Figure 5 is a side elevational view of the invention fitted to drive the forward axle.

Figure 6 is a plan view showing the manner in which the wheels of the twin axles turn about a given centre.

Figure 7 is a diagrammatic view showing the slight disturbance only of chassis due to the rear axle side wheel passing over an obstruction.

Figure 8 is a diagrammatic view showing the caster effect of the rear axle due to backing up movement of the vehicle.

In the drawings like characters of reference indicate corresponding parts in each figure.

The numeral 1 indicates generally the chassis of a motor vehicle which consists of a pair of longitudinal frame members 2 which are suitably connected together in spaced relation by transverse members, not shown. The rear end of the chassis is supported on semi-elliptic springs 5 in the usual way, which springs are connected in the usual way to an axle 6, hereinafter referred to as the first or forward axle. The axle 6 is in the embodiment shown in Figures 1, 2, 3, 5, and 6 a driving axle having a differential housing 7, a drive shaft 8 and forward wheels 9.

Assuming the vehicle to be intended for use as a semi-trailer, an auxiliary frame 10 is formed with side frame members 11 connected together by one or more cross members 14. The auxiliary side frame members 11 support a transverse shaft 15 which is journalled within bearings 16 secured upon the longitudinal frame members 2 of the chassis 1. A pair of transverse members 17 connect the auxiliary side frame members 11 adjacent their rear ends and support intermediate their length a turntable 18 having a centre pin 19. The rotating disk 20 of the turntable 18 carries on its underside a pair of hinge brackets 22 which are connected by a longitudinally extending shaft 23. A pair of spaced spring seats 25 are swingingly mounted upon the shaft 23 and are fitted with a pair of semi-elliptic transverse springs 26. Extending transversely between the springs 26 is a second or rear axle 28 upon the ends of which road wheels 29 are journaled. The axle is provided with spaced pairs of upstanding brackets 31, each pair mounting a longitudinally arranged pin 32 and depending pairs of shackles 33 are carried by said pins which are pivotally connected at their lower ends to the ends of the springs 26.

A pair of brackets 35 extend downwardly from the auxiliary frame members 10 which brackets are connected together at their lower ends by a cross member 36, see Figure 2, to carry the socket 37 of a ball and socket joint 38 of a wishbone 40. The rear or free ends of the wishbone are connected as at 41 to the rear axle. It will be obvious that by using transverse springs coupled by freely suspended shackles from the rear axle 28, that the axle and its wheels will be free to swing transversely relative to the forward wheels 9 when the chassis is being turned in either direction and that said transverse movement will be limited by the length of said shackles. The extent of this swing is such that the rear wheel will not permit a forward wheel to be contacted by the tire of an adjacent rear wheel.

Slidably mounted in guides 43 upon the frame members 11 is a platform 44 and on this platform a so-called fifth wheel 45 is pivotally mounted for the purpose of supporting the free end of the goose neck of a semi-trailer or equivalent part of a trailer body, not shown. The platform 44 is attached to the piston 47 of a hydraulic cylinder 48 and the cylinder is secured to any suitable part of the chassis 1. The fluid flow to and from the hydraulic cylinder is controlled from the cab 50 of the vehicle by any appropriate means, not shown.

It is desirable in many circumstances that the wheel base of a truck should be relatively short, in such case, in order to provide adequate length to the drive shaft 8 or possibly to provide for the use of an auxiliary transmission therein, that the rear axle should be driven, as shown in Figure 4. In such an installation the forward axle 6 would be cranked downwardly intermediate its length to provide adequate clearance for the drive shaft 8 to pass over it.

In use, when the trailer attached to the truck is loaded the load will need to be so distributed that half the trailer load is carried by its rear wheels and the forward half of said load distributed appropriately on the axles 6 and 28 and the front axle of the truck, which may be forty percent on the axles 6 and 28 and ten percent at the front axle to give steering traction. The fifth wheel 45 on which this forty percent load is pivoted will need to be moved to approximately a mid-position between the axles 6 and 28. If during the run soft ground is encountered so that traction is lost or impaired to the point of slipping, the ram cylinder 48 may be actuated to move the load and the fifth wheel more directly over the driving axle, thereby increasing the grip of the driven wheel or wheels upon the road to provide the necessary traction.

If the vehicle is running under light or no load conditions it is quite possible that there will be road conditions where the weight distributed on both axles 6 and 28 will not provide proper traction until the fifth wheel 45 is again moved to transfer the whole or part of the trailer front load onto the driving axle. Naturally any change in the distribution of the trailer load due to loading or unloading enroute may make it desirable to change the position of the fifth wheel upon its guides to the point where proper traction is always provided.

If the truck when the drive is to the axle 6 is running with no trailer or running without any other load, the rearward axle will be of no particular value, in which case the auxiliary frame 11 may be raised by any appropriate means and propped up at an angle on the longitudinal side members 2 and with the rear wheels raised off the ground. The above setting in effect would leave the truck as one with a single rear axle only, which axle would be suitably loaded to afford the necessary traction for light running.

It will be obvious that when moving forwardly the rear axle 28 will always trail the forward axle 6 and will swing to right or left about the ball and socket joint 38 as the vehicle is turned. This articulation of the rear axle eases the steering of the vehicle materially since the front of the vehicle pivots or swings about the forward axle and no transverse sliding or scuffing of the tires of the wheels of the rear axle takes place unless a very sharp turn is made, such as to bring one of the spring shackles almost to a horizontal position.

When backing up on a curve, it is found that immediately following the initial backing up movement the rear axle will swing around to its proper tracking position and will not tend to swing in an opposite direction to the intended turn, this action is thought to be a castering action whereby the rear axle lags slightly relative to centre pin 19 of the turntable 18 or closer to the forward axle 6.

What I claim as my invention:

1. The combination of the rear end of a motor vehicle frame supported upon an axle and an auxiliary frame and a wheeled axle therefor, said auxiliary frame being hingedly connected at its forward end to the vehicle frame adjacent the vehicle axle, a spring supporting the rear end of the auxiliary frame from the wheeled axle, a vertical pivot interposed between the spring and the auxiliary frame affording a slight rotational movement of said axle, a wishbone fulcrumed from a part of the auxiliary frame and connected to the ends of the wheeled axle, means affording a transverse swinging movement to the spring as the vehicle is moved about a curve and means adjustable lengthwise of the auxiliary frame for carrying part of the vehicle load upon said auxiliary frame.

2. The combination of the rear end of a motor vehicle frame as claimed in claim 1, wherein the transverse swinging means of the spring is a pair of shackles suspended from opposite ends of the wheeled axle and connected to the opposite ends of the spring.

References Cited in the file of this patent

UNITED STATES PATENTS

| | | |
|---|---|---|
| 1,986,832 | Lewis | Jan. 8, 1935 |
| 2,135,291 | Pinard | Nov. 1, 1938 |
| 2,317,508 | Zoder | Apr. 27, 1943 |
| 2,682,420 | Chelf | June 29, 1954 |

FOREIGN PATENTS

| | | |
|---|---|---|
| 155,971 | Australia | Apr. 23, 1953 |
| 422,712 | Germany | Dec. 9, 1925 |
| 424,781 | Germany | Feb. 1, 1926 |